(12) United States Patent  
Grove

(10) Patent No.: US 9,053,595 B2  
(45) Date of Patent: Jun. 9, 2015

(54) COIN IDENTIFICATION SYSTEM AND METHOD USING IMAGE PROCESSING

(71) Applicant: Jared Grove, Ardmore, PA (US)

(72) Inventor: Jared Grove, Ardmore, PA (US)

(*) Notice: Subject to any disclaimer, the term of this patent is extended or adjusted under 35 U.S.C. 154(b) by 165 days.

(21) Appl. No.: 13/745,897

(22) Filed: Jan. 21, 2013

(65) Prior Publication Data

US 2013/0202184 A1    Aug. 8, 2013

Related U.S. Application Data

(60) Provisional application No. 61/594,220, filed on Feb. 2, 2012.

(51) Int. Cl.
```
G06K 9/00    (2006.01)
G07D 5/00    (2006.01)
G07D 3/14    (2006.01)
```
(52) U.S. Cl.
CPC .. G07D 5/00 (2013.01); G07D 3/14 (2013.01); G07D 5/005 (2013.01)

(58) Field of Classification Search
USPC ......... 382/100, 103, 135, 136, 137, 138, 139, 382/140; 902/7; 705/45; 194/4; 209/534; 235/379; 356/71; 348/135, 169–172
See application file for complete search history.

(56) References Cited

U.S. PATENT DOCUMENTS

| | | | |
|---|---|---|---|
| 5,033,603 A | 7/1991 | Kai et al. | |
| 5,220,614 A * | 6/1993 | Crain | 382/136 |
| 5,224,176 A * | 6/1993 | Crain | 382/136 |
| 5,346,049 A | 9/1994 | Nakajima et al. | |
| 5,377,807 A | 1/1995 | Kojima et al. | |
| 5,767,506 A | 6/1998 | Bell | |
| 6,412,620 B1 * | 7/2002 | Imura | 194/317 |
| 6,499,581 B2 | 12/2002 | Yoshida et al. | |
| 6,761,257 B2 * | 7/2004 | Karlsson | 194/330 |
| 6,819,410 B2 * | 11/2004 | Adameck et al. | 356/71 |
| 6,929,110 B2 | 8/2005 | Dobbins et al. | |
| 7,743,902 B2 | 6/2010 | Wendell et al. | |
| 7,916,281 B2 * | 3/2011 | Haddock | 356/71 |
| 7,950,513 B2 | 5/2011 | Horian | |
| 7,963,382 B2 | 6/2011 | Wendell et al. | |
| 7,980,378 B2 * | 7/2011 | Jones et al. | 194/217 |
| 8,069,978 B2 | 12/2011 | Haire et al. | |
| 8,615,123 B2 * | 12/2013 | Dabic | 382/136 |
| 2004/0003981 A1 * | 1/2004 | Lee | 194/328 |
| 2006/0032726 A1 * | 2/2006 | Vook et al. | 194/328 |
| 2011/0270695 A1 * | 11/2011 | Jones et al. | 705/18 |
| 2012/0301009 A1 * | 11/2012 | Dabic | 382/136 |

* cited by examiner

*Primary Examiner* — Anand Bhatnagar  
(74) *Attorney, Agent, or Firm* — Daniel Boudwin; Global Intellectual Property Agency LLC

(57) ABSTRACT

A coin identification system and method is disclosed for determining the identity of a source coin by way of image processing. The system comprises a source coin image capture means, an image processing means, and an output that relays information to the user or sorts the coin according to its match results. The processing means compares at least one image of the source coin to a plurality of reference coin images, whereby the image of the source coin is manipulated and overlaid onto the reference coin images to determine if a match is available with a given probability. An embodiment of the system employs a coin collection and sorting device. Another embodiment contemplates a handheld electronic device that captures and processes the source coin. Both embodiments may connect to a remote server housing the reference coin information or store the information locally.

19 Claims, 11 Drawing Sheets

COIN IDENTIFICATION SYSTEM AND METHOD USING IMAGE PROCESSING

CROSS REFERENCE TO RELATED APPLICATION

This application claims the benefit of U.S. Provisional Application No. 61/594,220 filed on Feb. 2, 2012, entitled "Optical Coin Discriminator." The above identified patent application is herein incorporated by reference in its entirety to provide continuity of disclosure.

BACKGROUND OF THE INVENTION

1. Field of the Invention

The present invention relates to image processing methods and coin identification systems. More specifically, the present invention pertains to a coin identification system and method whereby a coin image is processed to determine its type, mint date, and value against a database of known coin images.

Coin collection is a popular activity among enthusiasts and traders that has grown from a personal interest hobby that related to conservation of the coins to a more professional business with standardized grading and an open trading forum for exchange of coins amongst different parties. Where rare and valuable coins used to be collected for posterity and personal enjoyment, coin collecting has risen to the degree in which professional graders are employed to determine coin value of a specific coin for a collector to evaluate his or her portfolio and determine fair market value of the coins within a collection amongst other coin collectors. Certain coins have historical value or are sufficiently rare that the current market price of the coin is vastly greater than their earlier levels. Determining the exact value, grade, and specific type of some coins can be difficult if the coins are amongst a greater assortment of less valuable coins or if the surfaces are sufficiently worn. Identifying, sorting, and grading coins within a larger population of other coins can be a time intensive and potentially expensive proposition, particularly if a professional grader is utilized to find rare coins within a larger collection.

The difficulty with determining the existence of a valuable coin is the lack of an automated means of searching through other coins in order to determine a potential rare coin in a collection of less valuable coins. Automated coin counters existing in the prior art and in the market place have varied technologies for the purposes of counting, separated, sorting, and determining the genuineness of coins being analyzed. However, few options exist for examining coins to determine both the type, mint mark, and a potential grade of the coin between a plurality of coins. Further still, determining the exact coin type, mint mark, and potential value of a specific coin can be difficult for novice and even experienced coin collectors. The coin surface can wear over time and it may become difficult to identify and classify the coin against a reference, if a suitable reference is even available to the collector.

The present invention contemplates a system and method for identifying, sorting, and cataloging coins using an image capture means and an image processing means, whereby both faces of a target coin are analyzed against a database of known coin images, or reference images. The target coin is first separated from a plurality of others inserted into the system, whereby the coin travels through a singular coin path for both of its faces to be optically scanned or photographed. Thereafter, the image processing means analyzes the surface contours, the surfaces edges, and the shape of the coin to determine its identity and potential grade using a reference database of known coin images. If the system cannot identify the specific coin, the user is notified of a non-match, alerting the user of a counterfeit coin, a coin not available in the database, or a coin that is sufficiently worn to inhibit suitable matching. Further provided is an extension of the system, whereby the method of coin identification is extended for use as an application in a handheld device having an image capture means.

2. Description of the Prior Art

Devices have been disclosed in the prior art that relate to coin discriminators and coin counters. These include devices that have been patented and published in patent application publications, and generally relate to discriminators having diverging elements, purposes, or intentions with regard to identifying or sorting coins. The present invention utilizes an image processing system and method that can identify the make and potential value of a coin amongst a greater population, automating the process of rare and valuable coin identification for collectors. The following is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,412,620 to Imura discloses a coin discriminating apparatus having a light emitting means directed toward a surface of a coin and a line sensor for capturing the reflected image pattern of the coin surface. The diameter of the coin and the reference pattern data of the coin surface are utilized to determine the type and denomination of the coin, whereby these variables are compared to image pattern data to match the reflected image to stored reference data. A magnetic sensor means can also be included to detect the magnetic properties of the coin and thus improve the means of determining the coin denomination. While the Imura device utilizes light and reference data to match coin denominations, its system and its method of matching diverge from the present invention, which utilizes photo optics and image processing to match the image with reference data stored within the system.

Another such device is U.S. Pat. No. 7,916,281 to Haddock, which discloses an apparatus for producing scattering signatures from a coin using a rotatable platform for holding the coin, an electromagnetic radiation source such as a laser, and a plurality of scattered signature collection elements such as a diode array for producing a detection signature unique to the coin for identification and evaluation thereof. The coin can be evaluated for coin grading for collectors, the coin can be analyzed to make a template for later review, and high fidelity coin identification can be processed using the Haddock means for determining ownership and identification of an exact coin. However, the Haddock system utilizes an electromagnetic radiation source as a means to analyze the coin, while the present invention utilizes an image capture and processing means. The cost and complexity of the present invention is significantly reduced when compared to the implementation and system required to utilize a laser analyzing source.

U.S. Pat. No. 6,499,581 to Yoshida discloses a coin discrimination apparatus that utilizes both optics and magnetic data to validate a coin and to prevent counterfeiting thereof, where specific denominations are analyzed against multiple criteria to ensure their validity. The apparatus comprises a magnetic sensor, an optical sensor, a reference optical data memory for storing reference optical data of coin denominations, and a reference magnetic data memory for storing reference magnetic data of the same coin denominations. The diameter and surface pattern data gathered by the optical sensor are used in conjunction with the magnetic data produced by the magnetic sensor to validate the authenticity of the coins and prevent collection of counterfeit coins. While disclosing a device that utilizes an optical scanning system and accessible memory for comparing a target coin, the Yoshida system and method differ from the present invention. The present invention relies solely on optical scanning on both faces of the coin, whereafter an image processing method is employed to verify the coin against a stored database of reference coin images for determining the type, year, and value of the coin being analyzed.

U.S. Pat. No. 5,346,049 to Nakajima discloses another coin discriminating apparatus that comprises a light source irradiating means for illuminating the surface of a coin to analyze for surface unevenness and its surface pattern. The irradiation source is a plurality of fiber optic light sources that illuminate the coin surface. A photoelectric converting means converts the reflected light from the coin surface into electrical signals that are interpreted and analyzed to determine the genuineness and type of coin being discriminated. Similar to the aforementioned prior art devices, the Nakajima device provides a coin discriminator with diverging elements with respect to the present invention. The present invention pertains to an image capture and image processing system, whereby both sides of the coin are simultaneously analyzed for determining the coin attributes against a known database of coin reference images.

Finally, U.S. Pat. No. 7,743,902 to Wendell discloses yet another coin discriminating and processing system that utilizes optics as a means to determine coin validity and to count a number of coins being deposited into the system. The system utilizes a light beam emitted across a coin path having a plurality of conveyed coins traveling therealong. A corresponding light sensor measures the number of interruptions of the light sensor as the coins travel along the coin path. The interruptions are counted to determine the number of coins passing thereby, whereby the number of each denomination can be counted using their own light source and detector to count the number of coins deposited into the system. While the Wendell device is a coin discriminator using optical sensors, its purpose and its system components differ from the present invention. The Wendell device is related to counting the number of coins passing a given location after being separated, while the present invention pertains to analyzing each specific coin inserted into the system for comparing its surface edges to stored reference data for cataloging and authentication purposes.

The present invention provides a system and a method of coin identification using an image capture means and image processing means to determine the type, mint mark, potential value, and identification of the coin. The system can be deployed in a device that sorts and separates a plurality of coins within a hopper and analyzes each coin individually, or alternatively the system may be deployed using a handheld, image capture and processing device. The goal is to quickly analyze and catalog coins by matching their features against a known database of coin reference images. It is submitted that the present invention is substantially divergent in design elements from the prior art, and consequently it is clear that there is a need in the art for an improvement to existing coin identification means using a coin image processing system and method. In this regard the instant invention substantially fulfills these needs.

SUMMARY OF THE INVENTION

In view of the foregoing disadvantages inherent in the known types of coin discriminator systems and coin processing means now present in the prior art, the present invention provides a new image processing coin discriminator that can be utilized for providing convenience for the user by deploying an image capture and processing means within a sorting device to sort and identify coins within a larger population, or alternatively identifying an individual coin using a handheld, image capture and processing device.

It is therefore an object of the present invention to provide a new and improved image processing coin discriminator system and method that has all of the advantages of the prior art and none of the disadvantages.

It is another object of the present invention to provide an image processing coin discriminator that utilizes an image capture means and an image processing means to analyze a first and second side of a coin and compare the processed image of the coin to a template coin image stored within a database.

Another object of the present invention is to provide an image processing coin discriminator that can determine the surface lines, contours, and shape of the coin using the coin image for matching the coin to a reference coin image.

Yet another object of the present invention is to provide an image processing coin discriminator that can identify the type, date, mint mark, and therefore the potential value of a target coin using an image processing method.

Another object of the present invention is to provide an image processing coin discriminator that comprises a system having at least one image capture means, a processing means, memory, and a database of reference coin images.

Another object of the present invention is to provide an image processing coin discriminator that comprises a coin sorting device that can accept a plurality of coins and individually analyze each coin, providing feedback to the user as to each coin type and sorting each coin based on the analysis.

Another object of the present invention is to provide an image processing coin discriminator that comprises a handheld device that utilizes the present system and method for capturing and processing a target coin.

A final object of the present invention is to provide an image processing coin discriminator that allows a user to discern the value, genuineness, and potential grade of a coin using an image capture and processing means.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
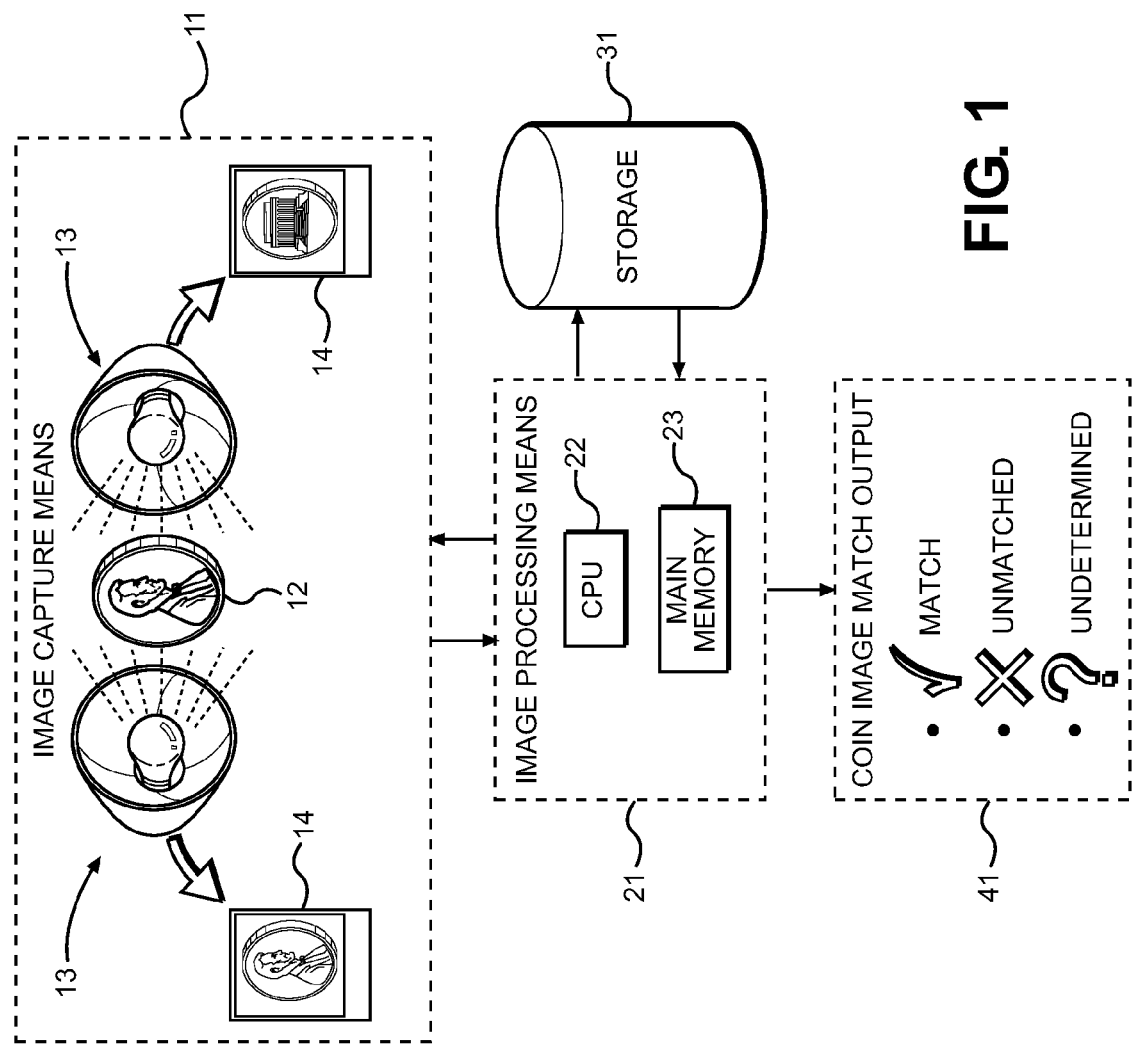
FIG. 1 shows a schematic diagram of the present system.

Reference is made herein to the attached drawings. Like reference numerals are used throughout the drawings to depict like or similar elements of the image processing coin discriminator. For the purposes of presenting a brief and clear description of the present invention, the preferred embodiment will be discussed as used for identifying and sorting coins based on an image processing method and a system. The figures are intended for representative purposes only and should not be considered to be limiting in any respect.

The present invention describes both a method and system for analyzing a source coin using an image capture means and an image processing means, whereby the coin surfaces are compared to reference coin images within a database to determine the identity of the coin for the user. The system is deployed within a coin sorting device or via a handheld image capture and processing device. The coin sorting embodiment of the system accepts several coins and analyzes each separately, while providing output in the form of a sorting process or direct communication with the user. The handheld system employs a handheld electronic device (e.g. a smartphone device) that includes a camera of sufficient fidelity and a processing means for analyzing and comparing the coin image to reference images. The reference images are stored locally on the device within a storage means, or alternatively the reference images can be stored on a remote server, whereby the handheld device or sorting embodiment has the capability of communicating to the remote server via a network interface means (e.g. a wireless antenna chip or Ethernet port). The method deployed for analyzing the coins utilizes an image processing means having several line and surface algorithms, whereby the details of the coin surface edges and the geometry of the coin can be compared to a plurality of reference coin images within a retrievable database, whereby the success of the match is given probability as to an absolute match between the source coin and a reference coin image. The match probability using several different matching algorithms are compared with one another to determine the highest probability match before communicating to the user the identity of the coin (if a match is indeed available in the reference coin database and if the source coin can indeed be analyzed given its surface properties).

Referring now to FIG. 1, there is shown a schematic diagram of the elements of the present system, whereby the system is capable of analyzing a source coin 12 based on an image processing method and comparing the processed image 14 to a stored database of known coin images. The system comprises an image capture means 11, an image processing means 21, and a storage means 31, whereby the elements function to provide an image processing computer system that provides a coin match output 41 based on the results of the processing method. The image capture means 11 preferably comprises at least one digital camera 13 or suitable image capture technology that is capable of creating a digital image 14 of a target coin 12 of sufficient fidelity such that the source coin's surface lines, contours, markings, geometry, and texture can be seen with clarity for further processing. The camera 13 further includes elements commonly found in the art of digital image capture devices, including a lens, an aperture, a shutter, an electronic image sensor, and an illuminating flash. Dual, opposing cameras 13 may be deployed to simultaneously capture an image 14 of both sides of the coin for processing both surfaces for improved matching.

The image processing means 21 comprises a processing means 22 such as a microprocessor or central processing unit (CPU) 22 and a main memory 23. The processing means 22 carries out programmed instructions of the matching method and carries out the operational instructions for the system elements. A storage means 31 stores digital information related to the reference images and the processing instructions for which the processing means 22 to carry out. A remote storage means 31 may also be utilized to retain the reference image information, thus reducing the local storage capacity requirements and allowing for updates to the database of images and the system to quickly be uploaded or changed without uploading new information to the local storage 31. The local storage means 31 comprises a mass storage device such as a computer hard disk or removable media, while the remote storage means may comprise a hard disk or server accessed remotely through a network accessed using a network interface means such as a wireless antenna chip or Ethernet port.

In operation, the image of a source coin 12 is first captured using the image capture means 11, whereby at least one side of the coin 12 is captured. Thereafter, the image processing means 21 interrogates the source image 14 and makes modifications thereto to highlight its shape, surface lines, markings, and indicia. The processing means 21 then compares the modified source image 14 with reference images within the storage means 31 in an iterative process to determine an appropriate match. Several matching criteria are used, whereafter the coin 12 is classified into one of three output categories 41: the source coin decidedly matched with a referenced coin image, the source coin being unmatched, or the source coin match being undetermined based on the quality of the source coin, its captured image, or based on the limited extent of the reference image database. The output 41 is provided to a user in a plurality of ways, including a visual indication of the match output or by sorting the target coin 12 based on a category (match/unmatched/undetermined, based on coin material type, or rather some combination of desirable sorting categories).

Figure 2:
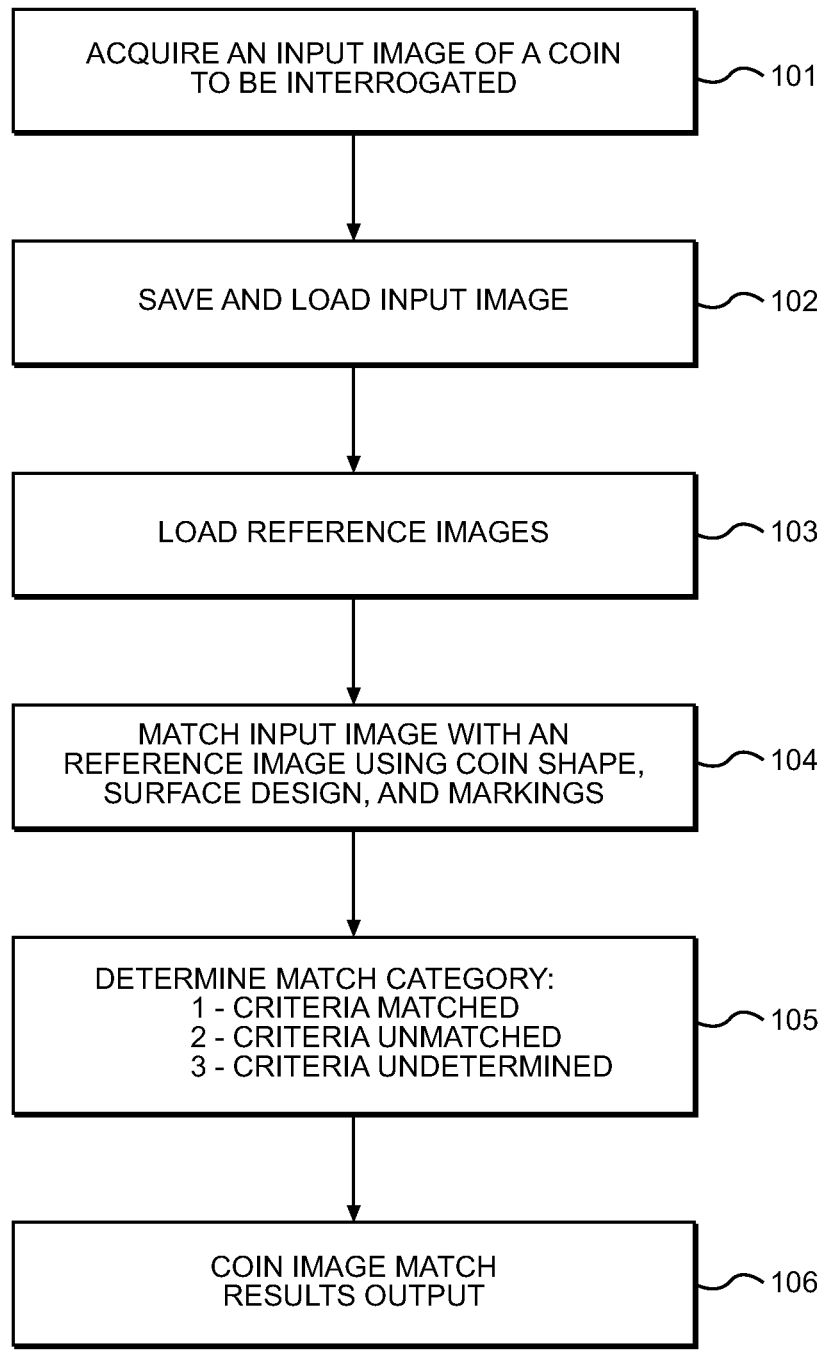
FIG. 2 shows a flow diagram highlighting the high level steps of the present method and system.

Referring now to FIG. 2, there is shown a flow diagram outlining the high level steps of the present image processing method, whereby a source coin is first interrogated for its features and then identified based on reference coin images. The method initiates when a source coin image is acquired 101 by the image capture means. This forms an input image to be analyzed, modified, and then compared with reference images in the system. The input image is saved 102 to the storage means and accessed using the main memory of the processing means. Thereafter, the main memory of the processing means loads consecutive references images 103 from the storage means to be compared separately with the source image. The source image is then analyzed using a matching algorithm and compared 104 with each reference image, loaded consecutively. The geometry of the coin, the lines of the coin surface, and the coin indicia are all compared against the loaded reference image to determine a probable match.

The matching process is an iterative process by which several different matching algorithms are deployed to determine the algorithm that provides the highest probability of match over a confidence interval. If a suitable match threshold is not surpassed, consecutive reference images are cycled to determine a more appropriate and higher probability match. If the highest match probability does not meet a suitable threshold, the output 105 is revealed as unmatched and the coin identity is not claimed. If the matching probability is sufficiency low or if the processing means cannot find suitable features on the source coin to match, the output 105 is shown as undetermined. Finally, if a suitable match is found, the coin identity is revealed 106 to the user or used in the system to sort the coin appropriately. This process utilizes the image processing means to cycle through matching algorithms and the reference images to match the source coin with sufficient certainty. The fidelity of the image capture means, therefore, the robustness of the image processing means, and the comprehensiveness of the reference image database must then be suitable to provide accurate output results, while also preventing false positives or false negatives.

Figure 3:
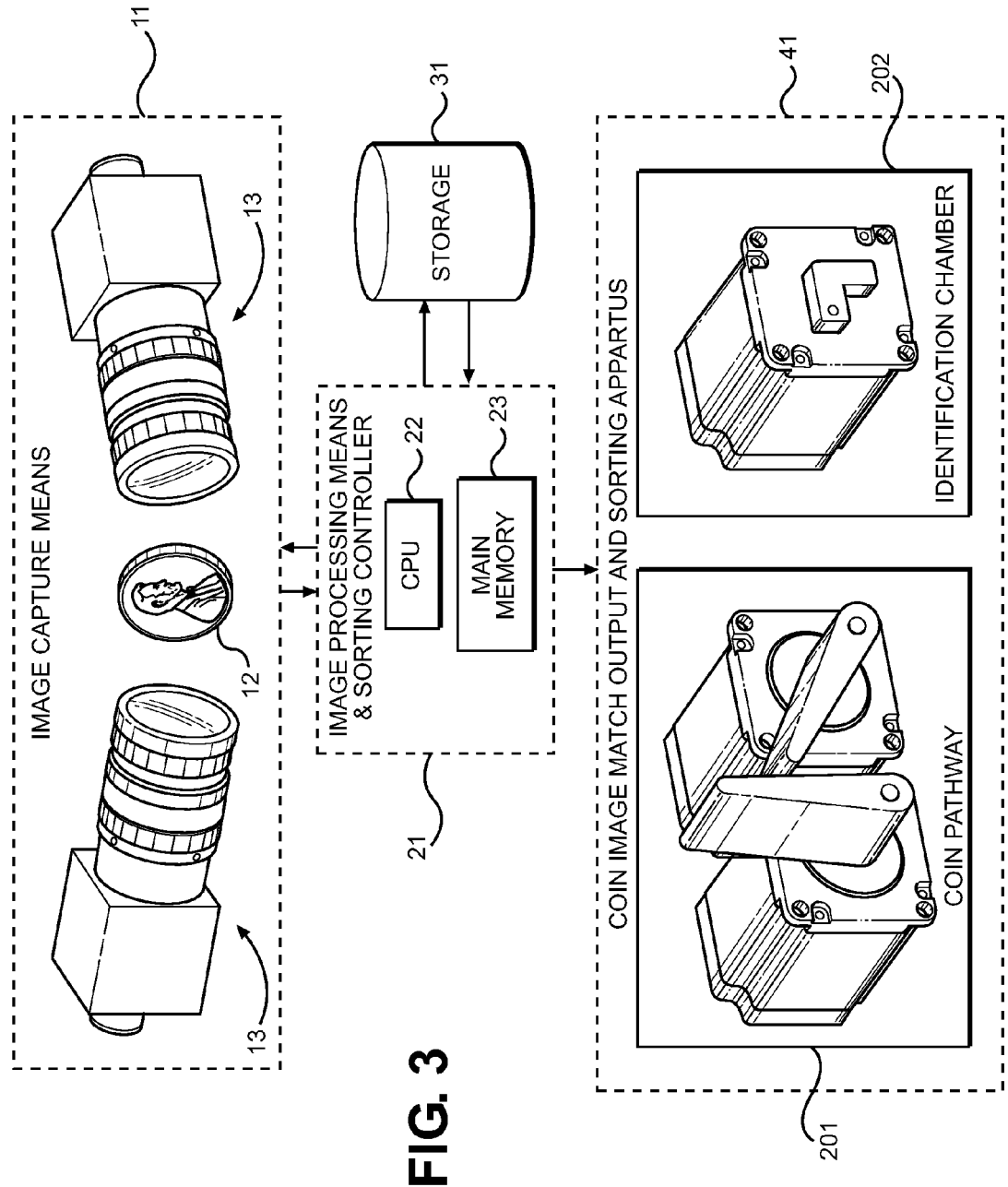
FIG. 3 shows an embodiment of the present invention shown in a schematic diagram, whereby a sorting device operates based on input from the present system and method.

Referring now to FIG. 3, there is shown a schematic view of the present invention, wherein the elements of the coin sorting embodiment are shown. The present method, when deployed in a coin separating apparatus, employs the same aforementioned system elements, however the output 41 involves sorting the source coin based on the results of the image processing and the matching results. In this embodiment, at least one camera 13 is present within the system to function as the image capture means 11. The image processing means 21 functions as a means to processing the source coin image, the image capture means controller, and the controller of the sorting apparatus 41 after the coin match probability has been determined. The image processing means 21 comprises the processing means 22 and main memory 23, which draws instructions from a storage means 31 to process the captured image of the target coin and to compare the captured image to reference images also stored on the storage means 31. As mentioned, the reference images may also be stored remotely on a secondary storage means to reduce local storage requirements and to improve efficiency of updating the system. Based on the results of the image processing, the match output 41 comprises releasing the source coin from an identification chamber within which the coin is supported as its image or images are captured. Once released, the coin travels to a sorting pathway and is routed to a specific bin or collection chamber. It is contemplated that electric motors or stepper motors are utilized to release the coin from the identification chamber 202 and also direct the coin through a particular pathway 201 using flappers or other suitable structures. The exact design and structural elements deployed within the sorting device can vary depending on the desired application, desired output, and the user requirements; however the basic system elements are retained prior to the sorting process.

Figure 4:
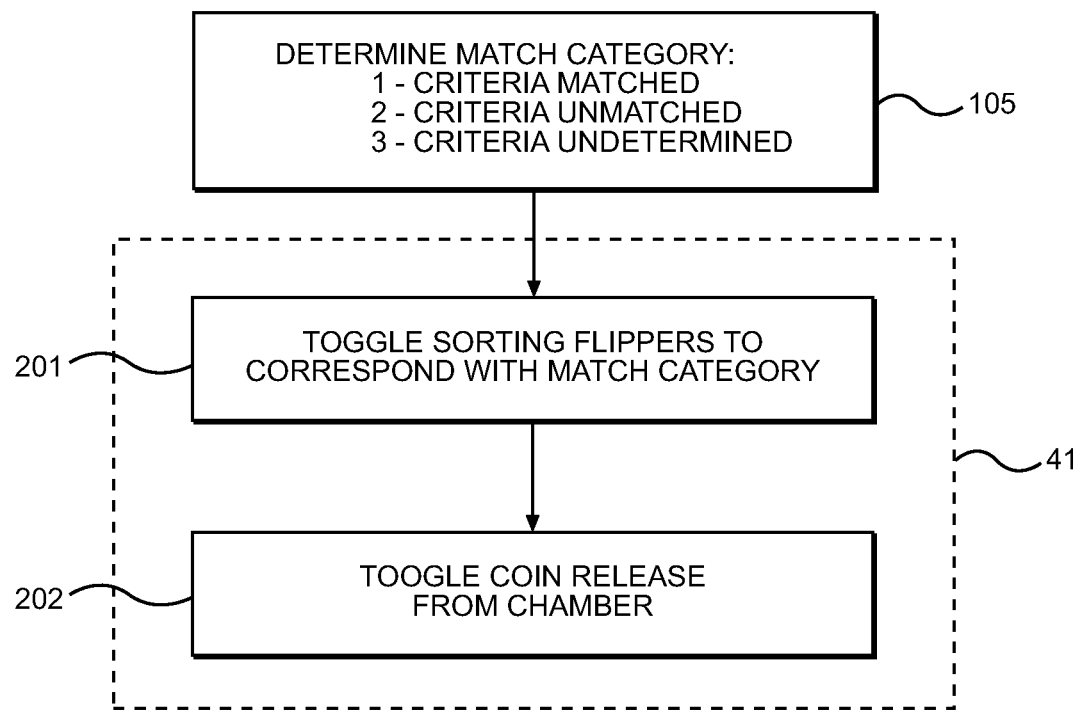
FIG. 4 shows the sorting device output steps based on the matching category provided by the system.

Referring now to FIG. 4, there is shown a flow diagram related to the output 41 of the coin sorting embodiment of the present system. In this embodiment, after the source coin match category 105 has been determined, the processing means communicates with the electric motor controllers or stepper motor controllers to toggle at least one sorting means 201 within the device to direct the source coin to a specific location based on its match category 105. In one embodiment, flappers are utilized to direct the source coin from its identification chamber and into a prescribed bin. The source coin is first supported within the identification chamber, where at least one of its surfaces is captured by the image capture means for processing. Once the match category 105 has been determined and the flappers have been toggled 201 to the correct output bin, a release within the source coin identification chamber 202 is toggled to drop or flow the source coin to the output bin. This notifies the user whether the coin is matched, or within what category the specific coin can be classified. In other embodiments, a visual output may also accompany the physical sorting process such that the user is notified of the coin match category and/or information about the coin.

Figure 5:
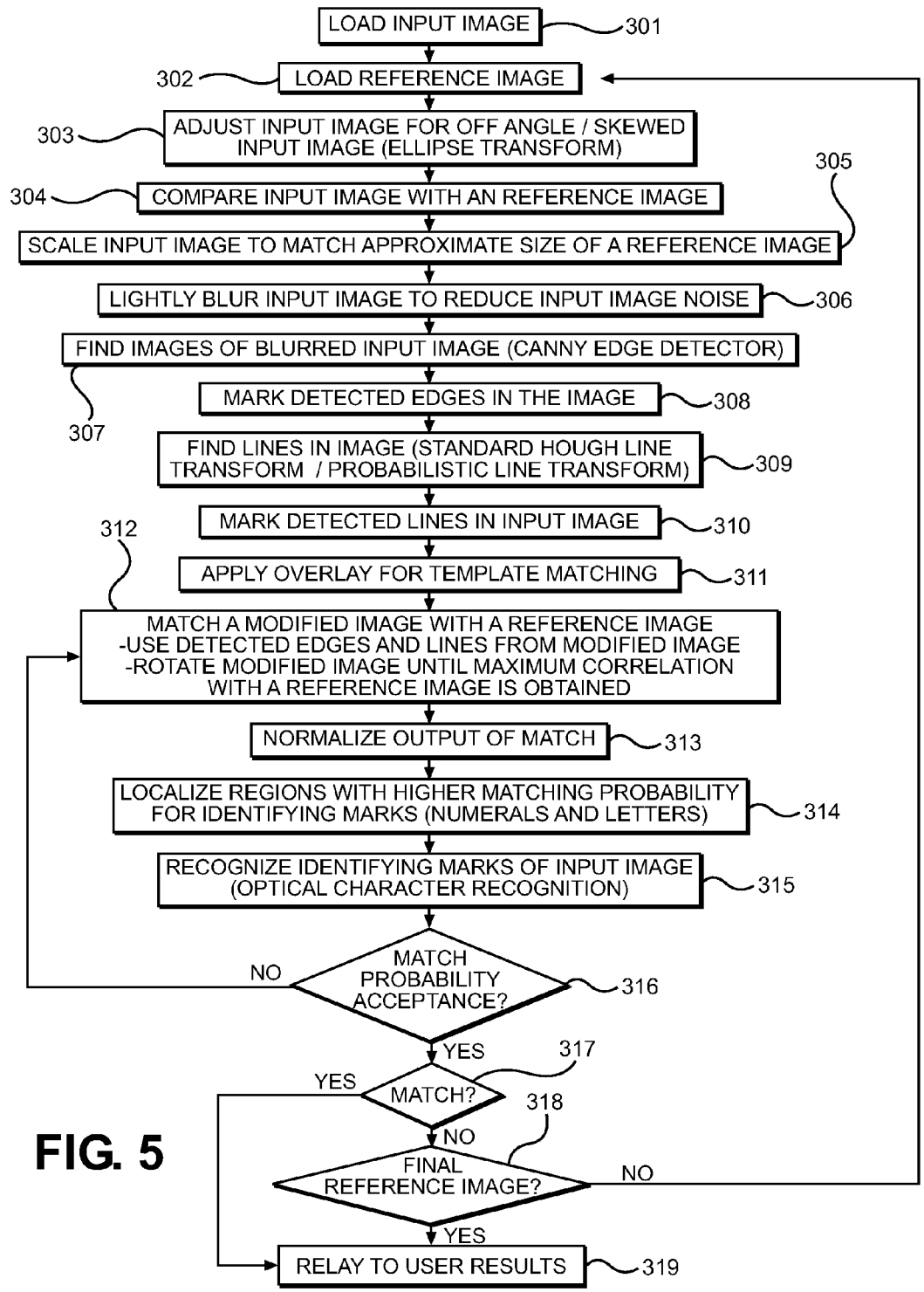
FIG. 5 shows a flow diagram of the present coin matching method.

Referring now to FIG. 5, there is shown a flow diagram outlining the present coin image processing method. The first step in the process involves isolating a source coin within an identification chamber or isolating an individual coin to be processed, after which at least one image of the coin is captured. The source coin image forms an input image for the process that is first loaded 301. While the source coin image is loaded, the first reference coin image is loaded 302 from within the reference image database. From here, the input image is adjusted 303 to account for an image of the coin that is not perfectly parallel to the image capture means lens. Depending on the circumstances with which the input image is taken, the coin can be tilted and thus skew the image thereof, creating an illusion of a deformed or skewed coin shape and corresponding surface lines. To compensate for a skewed input image, the method performs an ellipse transform operation to project the skewed image onto a plane whose normal is directed at the camera lens. Adjusting the input image for off-vertical camera angles involves recognizing the boundary of the object and if the boundary has an elliptical shape rather than a circular shape. The major and minor axes and then determined, whereafter the transformation proceeds by determining the major and minor axes of the source coin and stretching the image parallel to the minor axis while shrinking it parallel to the major axis until they are equal. This may also require some keystoning operations. The goal is to provide a corrected input image that is of circular shape for proper comparison with circular reference images.

Once the input image has been transformed 303, the input image is compared 304 with the loaded reference image. The input image is scaled 305 uniformly to match the approximate size (diameter) of the reference coin image. To reduce noise and minor imperfections of the source coin surface (and background area) within the input image, the input image is blurred 306 to soften the image for improved detection of its major surface lines and edges. Once blurred, the edges on the input image are detected 307 using a Canny edge detector operation. Major edges on the source coin are thus detected and thereafter marked 308 on the input image for comparison to the reference image. After edges are detected, surface lines of the input image are detected using a line transform operation (Standard Hough Line Transform or Probabilistic Line Transform). These lines are also marked on the input image 310, modifying the input image based first on detected edges and then based on detected lines. The input image is modified and stored within the storage means. Once edges and lines are marked on the input image, the input image is overlaid onto the reference image 311 for the matching procedure to commence. Up to this step, the steps have involved modifying the input image such that the matching steps will proceed with greater probability of match if indeed a match does exist within the reference image database.

Matching the modified input image with the loaded reference image proceeds by using the detected edges and lines from the modified input image, rotating the modified input image, and sliding the modified input image to correspond with the lines and edges of the reference image. Either the reference image or the modified input image may be rotated and slid during this comparison. The image being rotated and slid is moved one pixel at time. At each pixel location, a metric is calculated that represents how "good" or "bad" the match is at that pixel location (or how similar the reference is to that particular area of the modified input image). By rotating, the image being handled is rotated in a sequence of five degrees from center, and repeating the sliding process. This rotation can be repeated for a full rotation (360 degrees) of the image being handled (the modified input image or the reference image). For each pixel location during the rotation and sliding operation, the metric is stored in a results matrix (R). Each location (x,y) in R contains the match metric.

The process of matching the modified input image with the loaded reference image 312 proceeds using several different algorithms to determine the highest match probability. The highest match probability is then utilized as a result of the matching operation 312. These percentages can change dynamically because of the lighting on the source coin surfaces and the wear of the coin. The following is a list of algorithms utilized in the matching procedure. Each matching algorithm is well known in the art of image processing. The matching process proceeds by finding areas of an input image matching the template image whereby an each of the following algorithms is utilized:

Squared Difference Algorithm:

$$R(x, y) = \sum_{x',y'} (T(x', y') - I(x+x', y+y'))^2$$

Normalized Squared Difference Algorithm:

$$R(x, y) = \frac{\sum_{x',y'} (T(x', y') - I(x+x', y+y'))^2}{\sqrt{\sum_{x',y'} T(x', y')^2 \cdot \sum_{x',y'} I(x+x', y+y')^2}}$$

Cross Correlation Algorithm:

$$R(x, y) = \sum_{x',y'} (T(x', y') \cdot I(x+x', y+y'))$$

Normalized Cross Correlation Algorithm:

$$R(x, y) = \frac{\sum_{x',y'} (T(x', y') \cdot I(x+x', y+y'))}{\sqrt{\sum_{x',y'} T(x', y')^2 \cdot \sum_{x',y'} I(x+x', y+y')^2}}$$

Correlation Coefficient Algorithm:

$$R(x, y) = \sum_{x',y'} (T'(x', y') \cdot I(x+x', y+y'))$$

where:

$$T'(x', y') = T(x', y') - 1/(w \cdot h) \cdot \Sigma_{x'',y''} T(x'', y'')$$

$$I'(x+x', y+y') = I(x+x', y+y') - 1/(w \cdot h) \cdot \Sigma_{x'',y''} I(x+x'', y+y'')$$

Normalized Correlation Coefficient Algorithm:

$$R(x, y) = \frac{\sum_{x',y'} (T'(x', y') \cdot I'(x+x', y+y'))}{\sqrt{\sum_{x',y'} T'(x', y')^2 \cdot \sum_{x',y'} I'(x+x', y+y')^2}}$$

Figure 6:
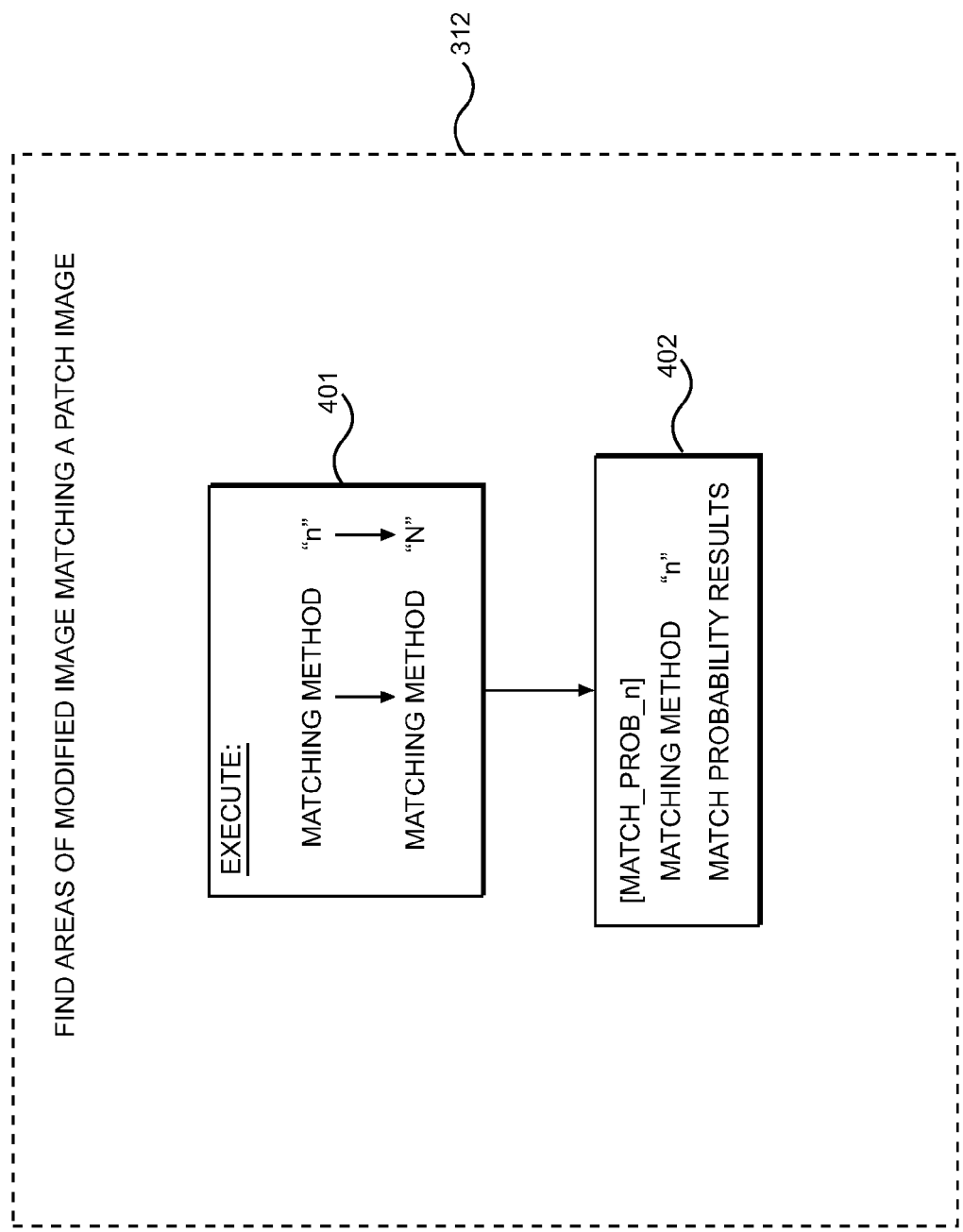
FIG. 6 shows the algorithm used to develop a strong match between a target coin being analyzed and a reference coin image.

The foregoing algorithms are utilized to match the modified input image to the reference image once overlaid over one another. All of these algorithms can be cycled through individually or some combination thereof. The highest match probability resulting from the deployed algorithms are then utilized as the match result for output of the system. Referring now to FIG. 6, there is shown an expanded flow diagram of the matching procedure 312, whereby the matching methods n through N are executed 401 in an iterative process. The given matching algorithm derives a match probability 402, which is then utilized in the overall flow of FIG. 5 to compare to the algorithm's match probably against preceding match probabilities to determine which algorithm has provided the highest match probability. Referring back to FIG. 5, the match output from the given algorithm is normalized 313 before regions of the input image with higher matching probability are identified 314 for matching surface marks and indicia of the coin. The identifying marks or indicia are then recognized 315 using optical character recognition (OCR) to determine what the indicia read. Once the matching procedure is conducted, the probably of the match is then compared against any previous algorithm's probability to determine if the probably of the given iteration is acceptable 316. If the matching algorithms have not been exhausted and if the matching probably is not to a sufficient standard, the matching process 312 initiates again with a different matching algorithm, whereby its match probability is determined. This proceeds until a sufficiently high probably of match is determined or if the algorithms have been exhausted.

If the results indeed provide a match with a sufficient probability, the results of the match being relayed 319 to the user or utilized in the sorting process. If the match probability is not sufficiently high, a subsequent reference image is loaded 302 for matching another reference coin to the input image. If the reference images within the database have been exhausted, the results of the non-match are relayed to the user 319 or forwarded to the sorting process for appropriate action. In this way, the input image is matched using several different matching methods for each reference image until a satisfactory output is reached. This is a sample flow that fulfills the goals of the present image processing method. It is contemplated that departures or more efficient steps may be incorporated in later designs of the method, however the basis of the coin identification procedure is image processing using line and edge detection and probabilistic matching algorithms that scan each pixel of the input image against the reference image and identify indicia on the source coin surface.

Figure 7:
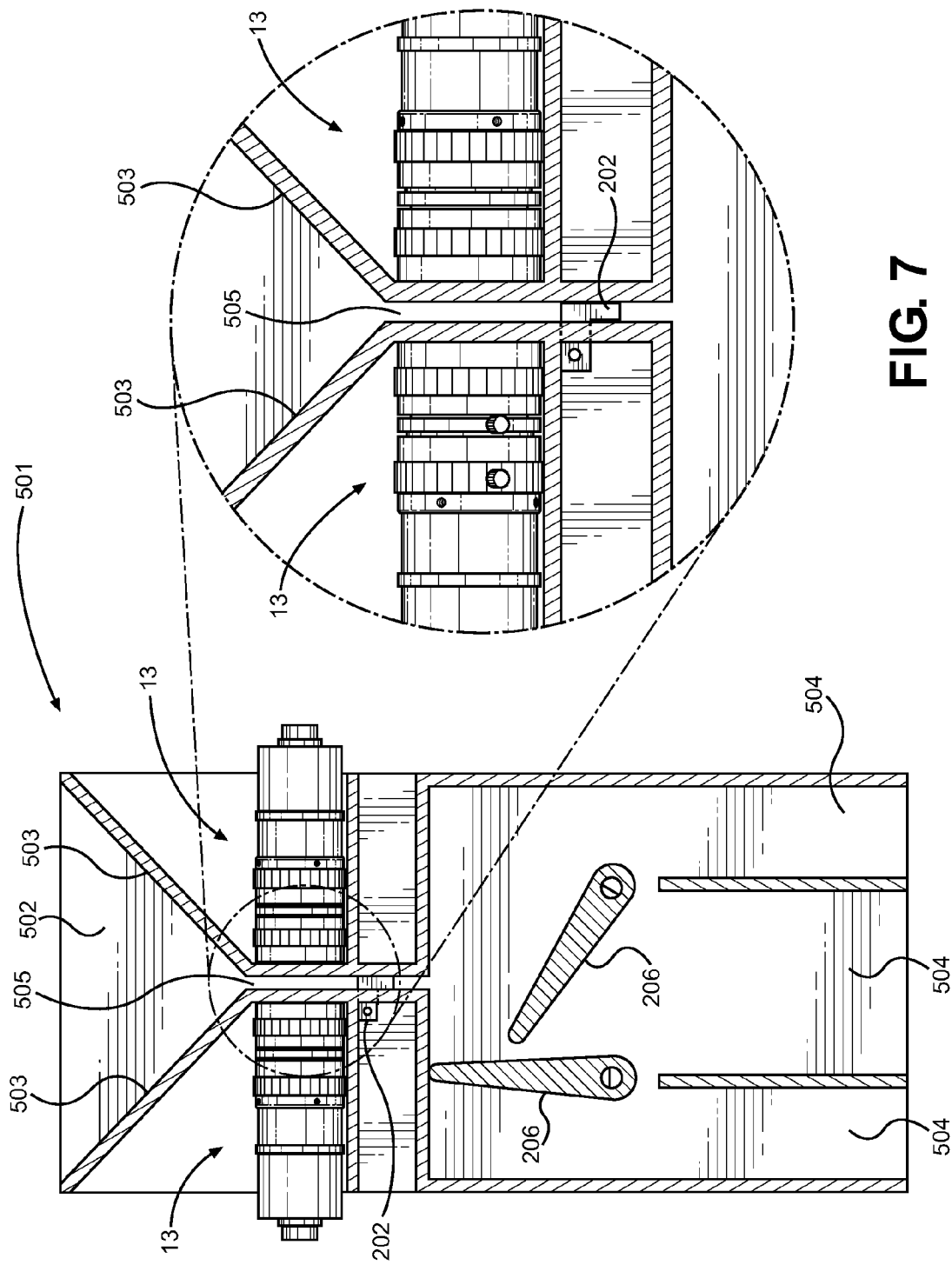
FIG. 7 shows a view of an embodiment of the present invention deployed in a sorting device, whereby a plurality of coins can be loaded and individually analyzed and thereafter sorted.

Referring now to FIG. 7, there is shown a cross section view of the coin sorting embodiment of the present method. In this embodiment, the system utilizes a sorting means as an output based on the input image processing. A first and second camera 13 positioned along opposing sides of a coin identification chamber 505 that supports the source coin during image capture and processing. The coin identification chamber 505 accepts a single coin at a time, whereby coins can be dropped into a coin deposit area 502 having sloping sidewalls 503 to direct a source coin into the identification chamber for processing. The source coin is supported within the chamber 505 via a perch 202 controlled by the chamber release motor, which rotates the perch 202 from a closed to and open position. When closed, a source coin is supported on its edge for image capture of one or both of its sides. When open, the perch withdraws from the interior of the chamber to allow the source coin to drop into a sorting area. Flapper elements 206 within the sorting area control the direction of the source coin after being released, whereby the coin is routed to a desired collection bin 504 therebelow.

Figure 8:
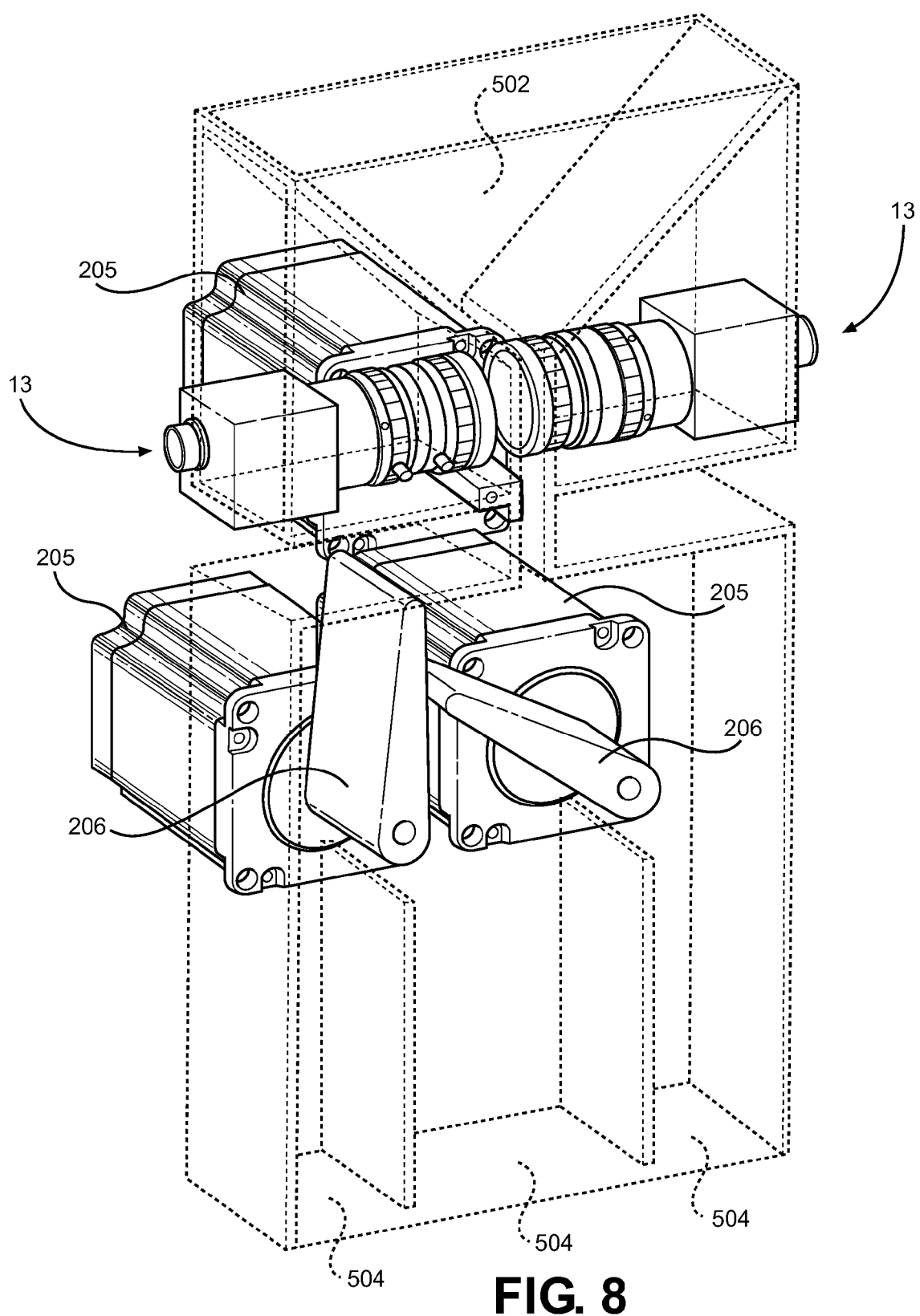
FIG. 8 shows another view of the sorting device.

Referring now to FIG. 8, there is shown another view of the coin sorting embodiment of the present invention. In this view, the stepper motors 205 of the release perch and the flapper elements 206 are visualized. It is contemplated that the number of flapper elements 206 and design of the sorting area may take several different forms, depending on the needs of the user and the number of output categories desired. It is desired to show a functional embodiment that can be used to analyze and optically analyze coins deposited into the device quickly and efficiently. The source coins are placed within the deposit area 502 one by one, or alternatively a sorting means can accept a plurality of coins at once and convey them individually into the identification chamber, whereafter the coins are sorted into collection bins 504 for the user.

Figure 9A:
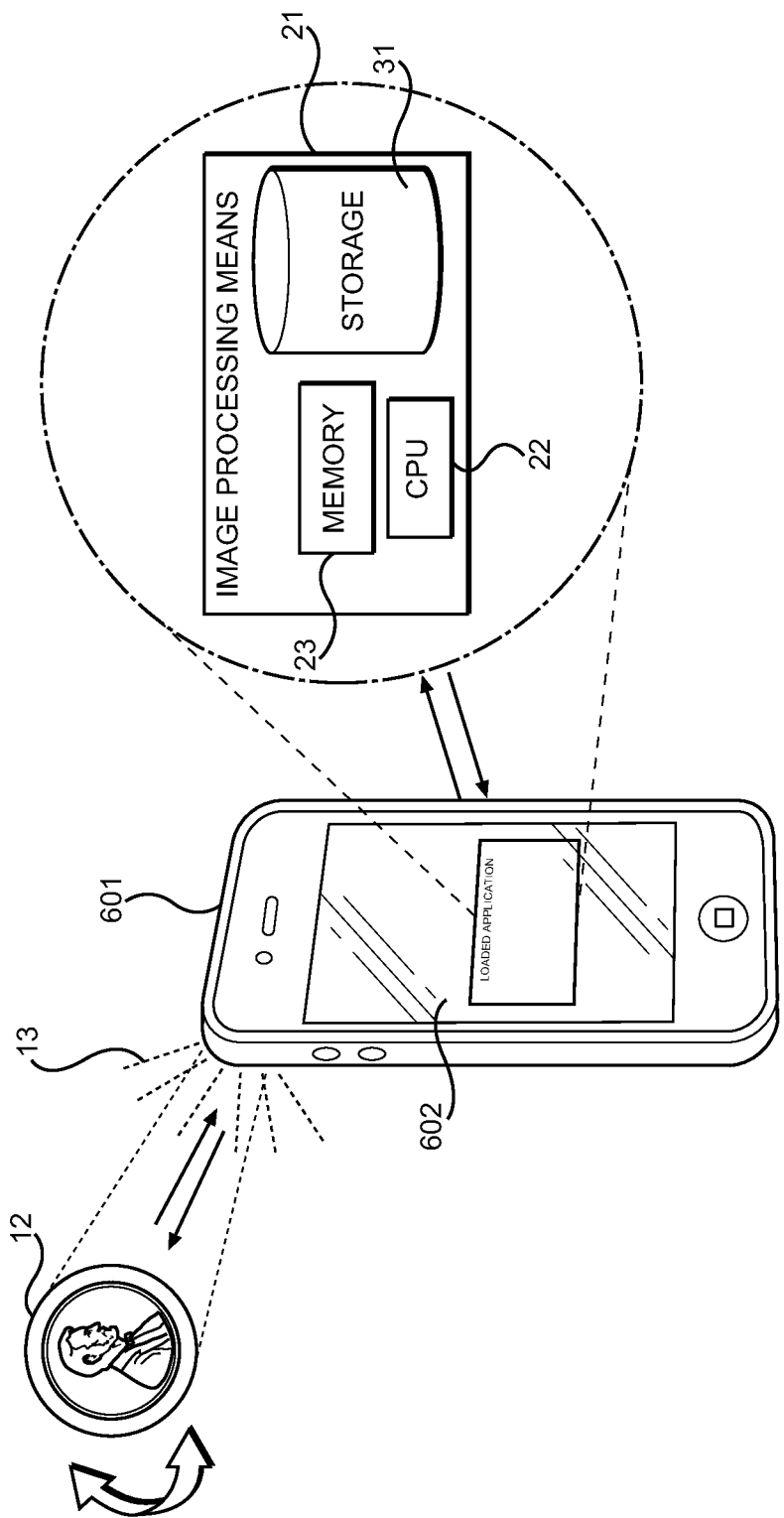
FIG. 9a shows a view of an embodiment of the present system and method, whereby a handheld device is deployed to capture and process the coin image.
Figure 9B:
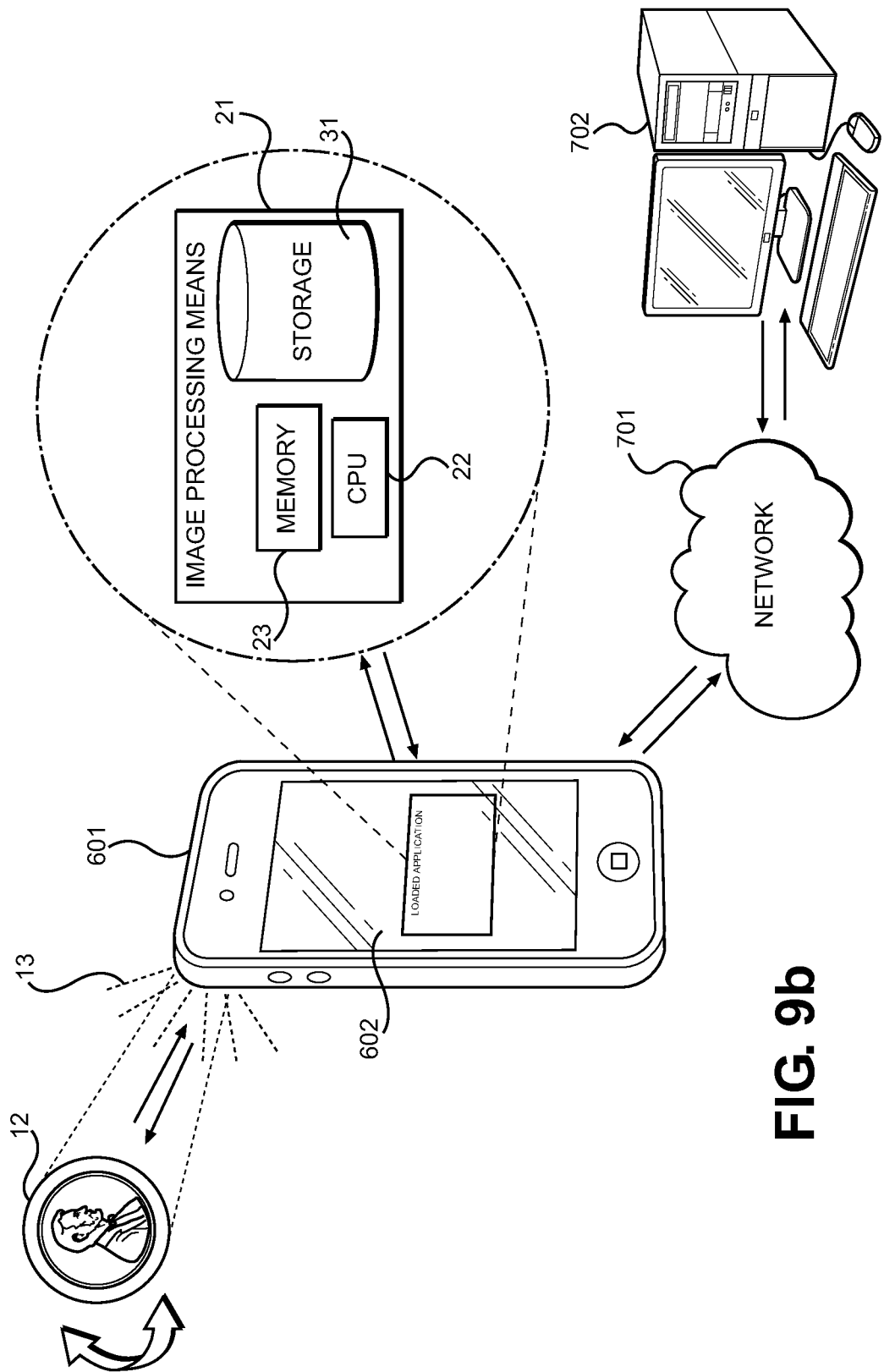
FIG. 9b shows a view of an embodiment of the present system and method, whereby a handheld device is deployed to capture and process the coin image using access to a remote server.

Referring now to FIGS. 9a and 9b, there is shown an embodiment of the present system in which a handheld electronic device or smartphone device 601 is employed as a means of capturing and processing a source coin 12 image. In this embodiment, the handheld device 601 incorporates the image processing means 21 and the image capture means of the system. Notably, a camera 13 along the device 601 allows a user to capture an image of the source coin 12, store the image onto the local storage means 31 within the device 602 while controlling the process through an application on the device interface 602. The image processing means 21 proceeds as with the sorting embodiment, wherein the source coin is captured as an input image to be compared against reference images stored within a database. The database may be stored locally on the device storage means 31, or alternatively the device may have network 701 connectivity. With connectivity to a network 701 using a network interface means (e.g. a wireless antenna chip or Ethernet port), the database can be stored on a remote server 702, reducing the storage needs of the device 601 and relying on the remote server 702 to store the files of the reference coin images. The network may comprise an internet network, a local area network, or a wireless network. A further embodiment and a variation to that configuration shown in FIG. 9b is the option for running the image processing means 21 on the remote server 702, as opposed to running the processing means 21 locally on the handheld electronic device 601. This embodiment allows the processing of the coin 12 to occur remotely, where improved computing power may be employed over that installed in the handheld device 601. The image is therefore processed remotely and the results of the information are relayed back through the network 701 for the handheld device to relay results to the user.

Figure 10:
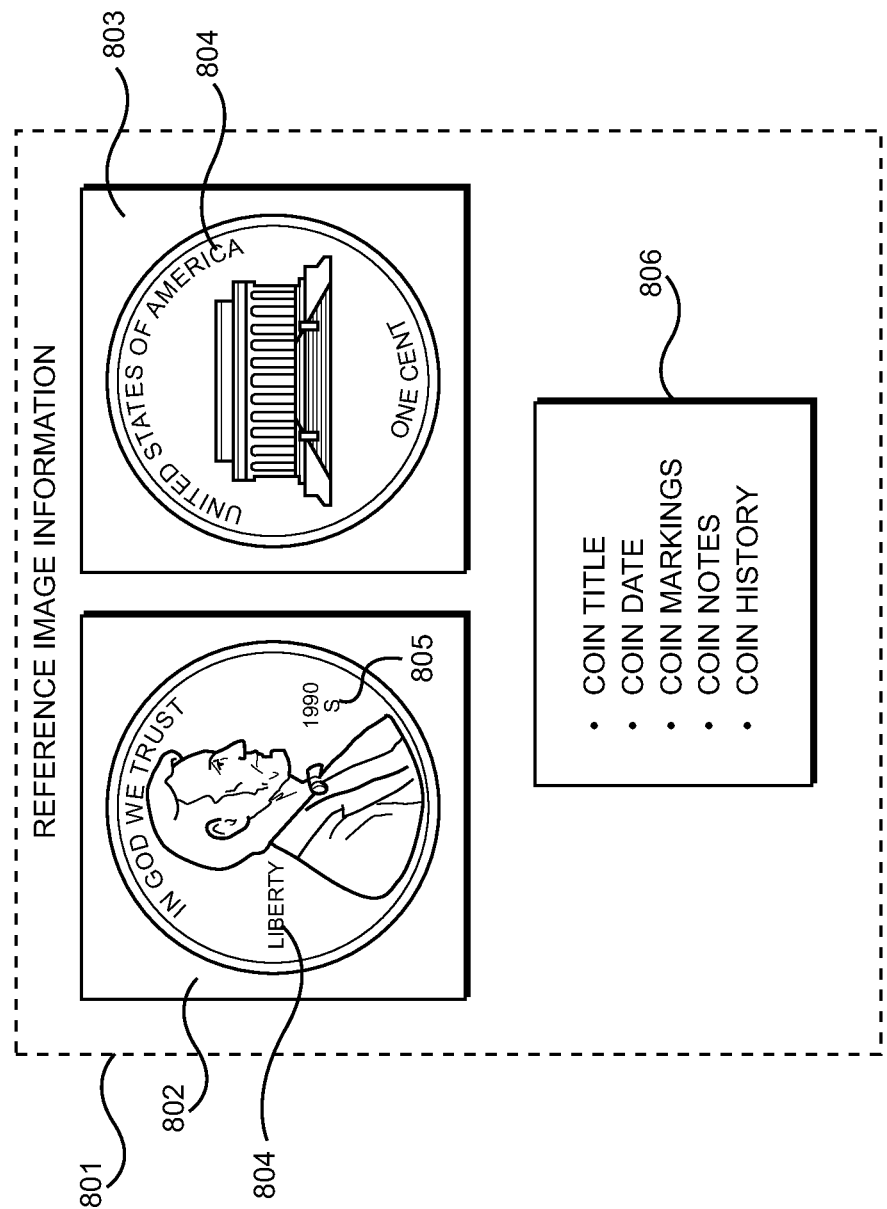
FIG. 10 shows an example of what information is provided on the reference image database, including image information for matching the target coin, mint marks, and other identifying and historical data for the coin.

Referring now to FIG. 10, there is shown a sample entry 801 in the reference coin database. It is contemplated that the first 802 and second 803 sides of the reference coin are available for comparing to the first and second sides of the source coin. The coin indicia 804, mint marks 805, geometry, and surface features are present in the reference images. Along with this visual data for image processing, related information and historical data 806 may also be stored within the database, providing a means for the user not only to be notified of the coin identity, but also provide some additional data related to the specific coin for user reference. Once the source coin is identified, ideally the owner would like to know its value and significance for further his or her coin collection or bargaining power in a coin transaction. The size requirements of the data and the storage limits of the specific embodiment of the present system will dictate the size of the reference images and the amount of associated data 806 accompanying each reference image.

Many rare and valuable coins exist in circulation today; however those not familiar with the hobby of coin collecting may overlook the subtle differences in coins that make one more valuable than another. A general layperson does not have an automated and robust way of identifying the value of a potentially rare coin within a larger collection or the ability to find information related to a specific coin of interest. Many individuals look to coin dealers and hobbyists in the hopes that they can identify the differences between the coins in order to determine their grade and market value. To prevent coin dealer shopping and to provide an efficient means of identifying a coin, the present invention is herein submitted for the purposes of identifying a coin with a high probability using image processing system.

The coin discriminators currently available in the prior art use a combination of optics and software algorithms to identify coin types. Although they can identify basic differences, such as coin types, these prior art devices have no way to sort or select coins based on the date or mint-mark of the coin. Additionally, there are no methods that can be easily deployed in both a sorting machine and a handheld device to identify a coin based on its type, year, mint-mark, geometry, surface features. The general difficulty with determining the existence of a valuable coin is the lack of an automated way of searching through a coin database in order to determine a potential value of a coin within a collection. Additionally, coin dealers and hobbyists cannot automatically sort and separate coins based on their value or some other chosen metric.

The present invention solves the issue of determining the identity of coins, whereby optics (preferably a camera or a laser source) build a digital image of the source coin, whereafter an image processing method determines the coin identity based on a large database of reference coin images from which to match the source coin thereto. Use of the present invention permits a coin enthusiast to efficiently identify coins and isolate those of particular interest or value. This automated process saves time from manually searching each coin by hand.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coin identifying system using image processing, comprising:
   an identification chamber that is adapted to receive a source coin therein;
   said source coin supported within said identification chamber via a perch;
   an image capture means for capturing an image of at least one side of said source coin when said source coin is within said identification chamber;
   an image processing means for comparing said image of said source coin with images of a reference coin;
   said image processing means comprising a processing means, a main memory, and a storage means;
   a database comprising images of said reference coin and said image of said source coin;
   said images of said reference coin individually compared against said image of said source coin to calculate a matching probability using at least one matching algorithm to determine a coin match output;
   wherein said coin match output is successful if said reference coin and said source coin match;
   wherein said coin match output is unsuccessful if said reference coin and said source coin mismatch.

2. The system of claim 1, wherein said database is stored within said storage means.

3. The system of claim 1, further comprising:
   a network;
   a network interface means;
   a remote server for storing said database.

4. The system of claim 3, wherein said image capture means and said image processing means comprise
   a handheld electronic device
   having said network interface means.

5. The system of claim 1, wherein said image capture means comprises at least one digital camera having a lens, an aperture, a shutter, and an electronic image sensor.

6. The system of claim 1, further comprising:
   sorting elements for routing said source coin from said identification chamber to a desired collection bin after said source coin is processed.

7. The system of claim 6, wherein said sorting elements comprise flapper elements within a coin sorting area for routing said source coin to said desired collection bin;
   wherein said flapper elements is controlled by an electric motor.

8. The system of claim 1, wherein said image capture means and said image processing means comprises a handheld electronic device.

9. The system of claim 8, wherein said handheld electronic device comprises a phone having a camera and a local storage means.

10. The system of claim 1, wherein said perch is controlled by a chamber release motor, which rotates said perch from a closed position to an open position.

11. A method of identifying a coin using image processing, comprising the steps of:
    capturing at least one input image of a source coin using an image capture means;
    detecting edges and lines of said source coin from said at least one input image of said source coin using an image processing means;
    wherein said image processing means utilizes an edge detector algorithm to find said edges of said source coin and said image processing means utilizes a line transform algorithm to find said lines of said source coin;
    comparing said edges and said lines of said source coin with edges and lines of a reference coin from images of said reference coin;
    determining whether said edges and said lines of said source coin and said edges and said lines of said reference coin match
    sorting said source coin based on a coin match output;
    routing said source coin into a first collection bin if said reference coin and said source coin match;
    routing said coin match into a second collection bin if said reference coin and said source coin mismatch;
    routing said coin match output into a third collection bin if it is undetermined whether said reference coin and said source coin match.

12. The method of claim 11, wherein detecting said edges and said lines of said source coin and comparing said edges and said lines of said source coin with said edges and said lines of said reference coin further comprises the steps of:
    adjusting said at least one input image based on skew or angle of said source coin;
    scaling said at least one input image to match approximate size of said images of said reference coin;
    blurring said at least one input image to reduce noise on said at least one input image;
    highlighting said edges and said lines on said at least on input image of said source coin to create a modified input image;
    overlaying said modified input image over said images of said reference coin.

13. The method of claim 11, further comprising the steps of:
    loading a subsequent reference image if said reference coin does not match said source coin.

14. The method of claim 11, wherein determining whether said source coin and said reference coin match further comprises the steps of:
    using at least one matching algorithm in an iterative fashion to calculate a matching probability for determining said coin match output;
    wherein said source coin and said reference coin match and said coin match output is successful if said matching probability is above a predetermined threshold;
    wherein said source coin and said reference coin mismatch and said coin match output is unsuccessful if said matching probability is below said predetermined threshold.

15. The method of claim 11, wherein comparing said edges and said lines of said source coin and said edges and said lines of said reference coin further comprises the steps of:
    normalizing a coin match output;
    identifying markings of said source coin from said at least one input image;
    recognizing said markings of said source coin using optical character recognition.

16. The method of claim 15, wherein said markings comprise numbers and letters of said source coin.

17. The method of claim 11, wherein said image capture means and said image processing means comprises a coin sorting device.

18. The method of claim 11, wherein said image capture means and said image processing means comprises a hand-held electronic device.

19. The method of claim 11, further comprising the steps of:
   utilizing a network connection to remotely store a database on a remote servers;
   wherein said database comprises said images of said reference coin and said at least one input image of said source coin.

* * * * *